United States Patent [19]

Carlebach

[11] Patent Number: 5,691,823
[45] Date of Patent: Nov. 25, 1997

[54] APPARATUS AND METHOD FOR RANDOM SCREENING

[75] Inventor: Ephraim A. Carlebach, Ra'anana, Israel

[73] Assignee: Scitex Corporation Ltd., Herzliya, Israel

[21] Appl. No.: 494,958

[22] Filed: Jun. 26, 1995

[51] Int. Cl.⁶ .................................................. H04N 1/23
[52] U.S. Cl. ................................. 358/457; 358/534
[58] Field of Search ........................... 358/533–536, 358/454–459; 395/109

[56] References Cited

U.S. PATENT DOCUMENTS

| | | | |
|---|---|---|---|
| 4,084,183 | 4/1978 | Keller et al. | 358/534 |
| 4,342,046 | 7/1982 | Kamata | 358/536 |
| 4,456,924 | 6/1984 | Rosenfeld | 358/75 |
| 4,825,298 | 4/1989 | Ikuta et al. | 358/298 |
| 4,918,622 | 4/1990 | Granger et al. | 364/518 |
| 5,045,931 | 9/1991 | Sakamoto | 358/534 |
| 5,055,923 | 10/1991 | Kitagawa et al. | 358/534 |
| 5,594,839 | 1/1997 | Shu | 395/109 |
| 5,602,971 | 2/1997 | Deschuytere | 395/109 |

FOREIGN PATENT DOCUMENTS 2157119  3/1985  United Kingdom ............. H04N 1/00

OTHER PUBLICATIONS

R. Floyd and L. Steinberg, "An Adaptive Algorithm for Spatial Gray Scale", Proc. of the SID, vol. 17, No. 2, pp. 75–77, 1976.

*Primary Examiner*—Edward L. Coles, Sr.
*Assistant Examiner*—Stephen Brinich
*Attorney, Agent, or Firm*—Ladas & Parry

[57] ABSTRACT

Apparatus and a method for random screening including an exposure select operator which receives two-dimensional coordinate information relating to a screen and input density information relating to an image to be screened, the operator being characterized in that for a constant input density it provides a constant exposure output over each of a multiplicity of groups of contiguous coordinate regions, at least some of which groups are mutually non-aligned.

6 Claims, 5 Drawing Sheets

APPARATUS AND METHOD FOR RANDOM SCREENING

FIELD OF THE INVENTION

The present invention relates to the recording of a halftone picture and more particularly to a method and apparatus for electronic halftone dot generation in image reproduction.

BACKGROUND OF THE INVENTION

Electronic screening for image reproduction is well established in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded with threshold values, defining a cell memory matrix. Input digitized scanned density values of an image, such as a color separation, are compared with the threshold values, cell by cell. The results provide an on/off control input for a laser plotter.

U.S. Pat. No. 4,825,298 to Ikuta and Mural describes a technique for generating a screened reproduction of an image which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicating lighting of the exposure beam when one of the coordinates (x,y) is between upper and lower limit values, corresponding to the same, which are previously determined for each combination of the other of the coordinates (x,y) and the density value of the image signal.

The technique of U.S. Pat. No. 4,825,298 to Ikuta and Murai has the disadvantage that its memory requirements are high.

U.K. Published patent application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

In U.S. Pat. No. 4,918,622 there is described an electronic graphic arts screener in which a three-dimensional memory array is employed for screen dot generation.

Conventional techniques for screen dot generation, exemplified by that described in U.S. Pat. No. 4,456,924 represent each input density level by a screen dot of a corresponding number of dot elements. The difference between a relatively lower input density and a relatively higher input density is indicated by adding predetermined additional dot elements at predetermined locations to those dot elements at predetermined locations which represent the lower input density. Thus the set of dot elements which makes up a relatively higher input density dot always includes the subset of the dot elements which makes up a relatively lower input density dot.

The following reference is relevant to error diffusion:

R. Floyd and L. Steinberg, "An Adaptive Algorithm for Spatial Gray Scale," Proc. of the SID, vol. 17, no. 2, pp. 75–77, 1976.

SUMMARY OF THE INVENTION

The present invention seeks to provide an improved method and apparatus for generating a screened reproduction of an image.

There is thus provided in accordance with a preferred embodiment of the present invention apparatus for random screening comprising an exposure select operator which receives two-dimensional coordinate information relating to a screen and input density information relating to an image to be screened, the operator being characterized in that for a constant input density it provides a constant exposure output over each of a multiplicity of groups of contiguous coordinate regions, at least some of which groups are mutually non-aligned.

Preferably at least some of the groups have areas which are identical but configurations which are not all identical.

There is also provided in accordance with a preferred embodiment of the present invention apparatus for random screening comprising an exposure select operator which receives two-dimensional coordinate information relating to a screen and input density information relating to an image to be screened, the operator being characterized in that it provides, for a given input density, a multiplicity of minimum size clusters of contiguous regions which are either all exposed or all not exposed, arranged generally along exposure lines and in columns perpendicular thereto, the edges of adjacent ones of clusters which lie generally along the same exposure line or column not all being precisely mutually aligned therealong.

In accordance with a preferred embodiment of the present invention, the operator provides for a given input density, a multiplicity of clusters of contiguous regions which are either all exposed or all not exposed, whose areas are identical but whose configurations are not all identical.

There is additionally provided in accordance with a preferred embodiment of the present invention apparatus for random screening comprising an exposure select operator which receives two-dimensional coordinate information relating to a screen and input density information relating to an image to be screened, the operator being characterized in that for a constant input density it provides a constant exposure output over each of a multiplicity of groups of contiguous coordinate regions, at least some of which groups have areas which are identical but configurations which are not all identical.

Preferably all of the multiplicity of groups comprise an identical number of coordinate regions.

There is additionally provided in accordance with a preferred embodiment of the present invention a method for random screening comprising an exposure select operation which receives two-dimensional coordinate information relating to a screen and input density information relating to an image to be screened, the operation being characterized in that for a constant input density it provides a constant exposure output over each of a multiplicity of groups of contiguous coordinate regions, at least some of which groups are mutually non-aligned.

Preferably at least some of the groups have areas which are identical but configurations which are not all identical.

There is also provided in accordance with a preferred embodiment of the present invention a method for random screening comprising an exposure select operation which receives two-dimensional coordinate information relating to a screen and input density information relating to an image to be screened, the operation being characterized in that it provides, for a given input density, a multiplicity of minimum size clusters of contiguous regions which are either all exposed or all not exposed, arranged generally along exposure lines and in columns perpendicular thereto, the edges of adjacent ones of clusters which lie generally along the same exposure line or column not all being precisely mutually aligned therealong.

In accordance with a preferred embodiment of the present invention, the operation provides for a given input density, a multiplicity of clusters of contiguous regions which are either all exposed or all not exposed, whose areas are identical but whose configurations are not all identical.

There is additionally provided in accordance with a preferred embodiment of the present invention a method for random screening comprising an exposure select operation which receives two-dimensional coordinate information relating to a screen and input density information relating to an image to be screened, the operation being characterized in that for a constant input density it provides a constant exposure output over each of a multiplicity of groups of contiguous coordinate regions, at least some of which groups have areas which are identical but configurations which are not all identical.

Preferably all of the multiplicity of groups comprise an identical number of coordinate regions.

It is appreciated that the grouping of the contiguous coordinate regions is preferably independent of input density.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
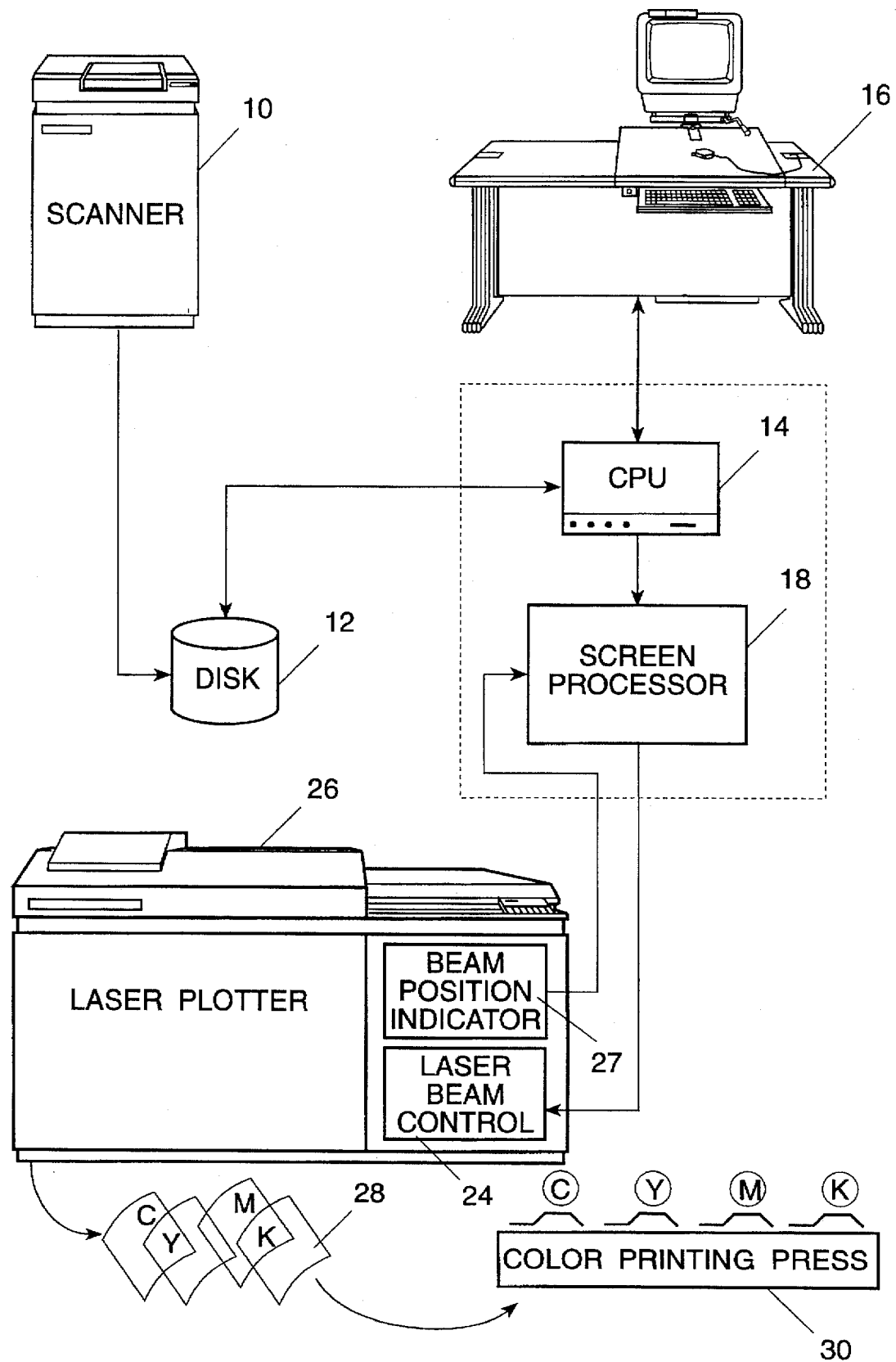
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel Pentium.

Interfacing with the CPU 14 is an interactive workstation 16, such as a Scitex Prisma, manufactured and sold by Scitex Corporation Ltd. of Herzlia, Israel.

CPU 14 also interfaces with screen processor circuitry 18 which provides a control output to laser beam control circuitry 24 in a laser plotter 26, such as a Raystar, manufactured and sold by Scitex Corporation Ltd. of Herzlia, Israel. The laser plotter 26 includes beam position indicator apparatus 27, which provides an output to screen processor 18.

Laser plotter 26 produces halftone film color separations 28 which are employed in a conventional process color printing press 30, to produce process color prints.

Screen processor circuitry 18 is illustrated in greater detail in FIG. 5 and will be described hereinbelow.

Figure 2:
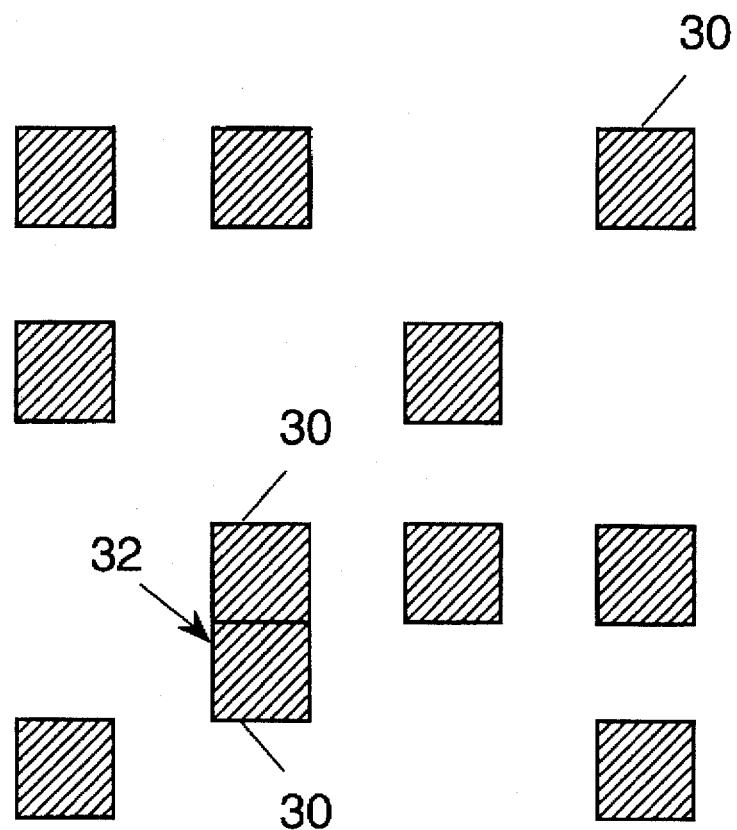
FIG. 2 is an illustration of a portion of a screened halftone representation produced in accordance with the prior art for a constant input density.

Reference is now made to FIG. 2, which illustrates a portion of a random screen halftone representation produced in accordance with the prior art. It will be appreciated that the minimum size dark area is in fact produced by multiple dot exposures, and typically covers a 2×2 pixel area 30. The random screen halftone representation may comprise dark areas 32 which include multiple minimum size dark areas 30.

In accordance with a preferred embodiment of the present invention, randomness may be applied to the precise location of the minimum size dark area. Accordingly, the minimum size dark areas may be shifted from their nominal locations, in a random manner, by one exposure location in either of the X and Y directions.

Figure 3:
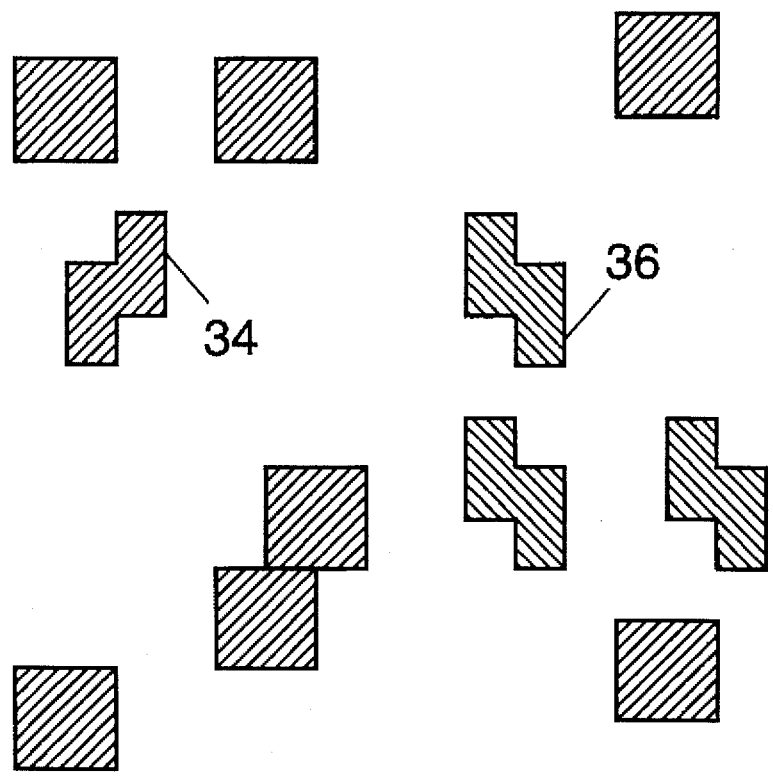
FIG. 3 is an illustration of a portion of a screened halftone representation produced in accordance with the present invention for a constant input density.

Further in accordance with a preferred embodiment of the present invention a certain randomness may be applied to the configuration of the minimum size dark area, by shifting only part of a minimum size dark area. Accordingly, the minimum size dark area need not be a square, typically 2×2, as shown in FIG. 2, but may be instead a non-square, 4 dot exposure area, typically as shown at reference numerals 34 or 36 in FIG. 3.

Figure 4:
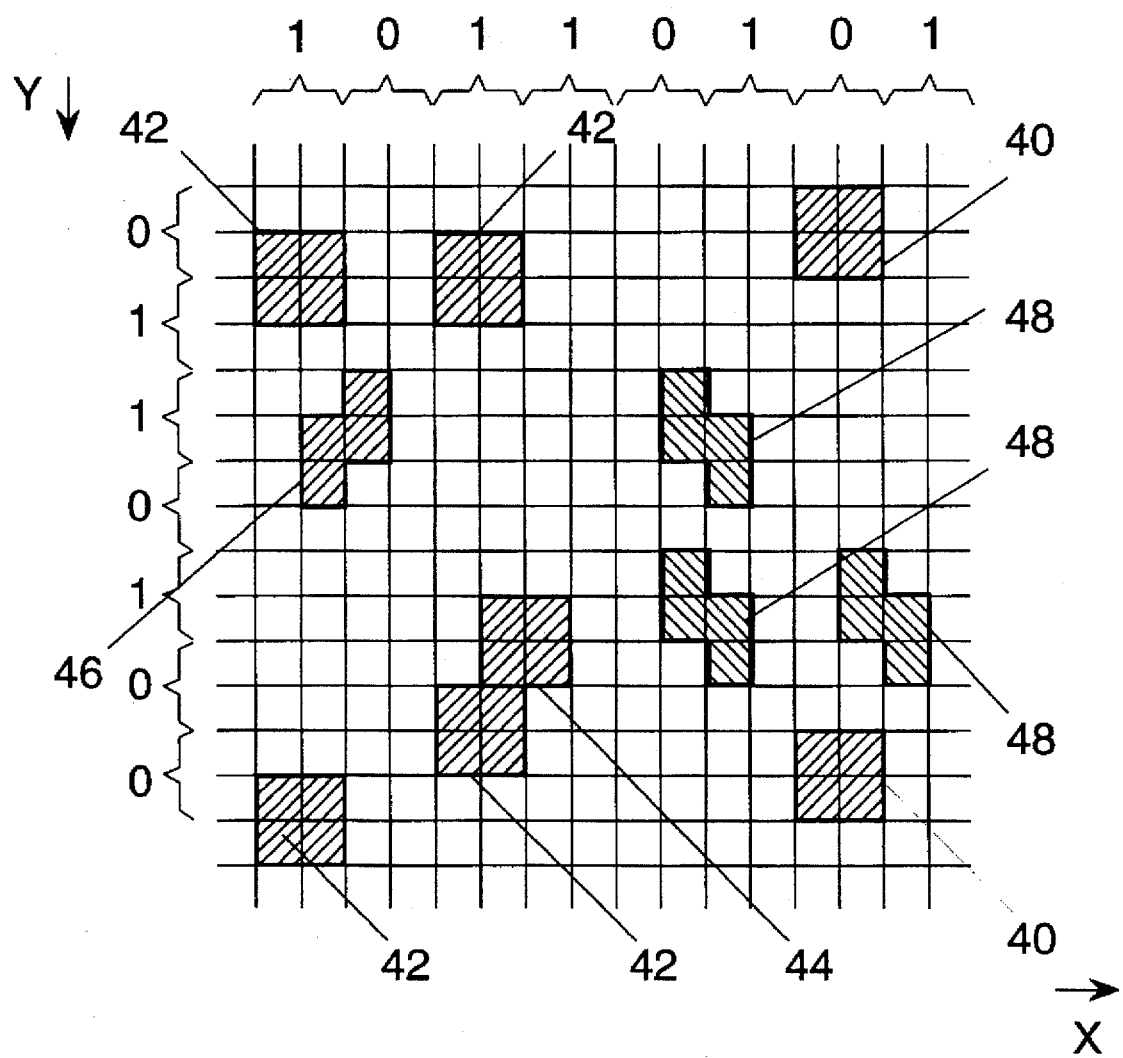
FIG. 4 is an illustration corresponding to FIG. 3, with the addition of a grid and an indication of microshifts in accordance with the present invention.

The mechanism of the shifting in accordance with a preferred embodiment of the invention will be better understood from a consideration of FIG. 4. Reference numeral 40 illustrates an unshifted minimum size dark area, whose location is indicated by shift indices 0,0.

Reference numeral 42 refers to a minimum size dark area whose location is shifted in the Y direction by one exposure location and which is not shifted in the X direction.

Reference numeral 44 refers to a minimum size dark area whose location is shifted in the Y direction by one exposure location and which is shifted in the X direction by one exposure location.

Reference numeral 46 refers to a minimum size dark area whose location is shifted in the X direction by one exposure location and the location of half of which is shifted in the Y direction. It is seen that a non-square configuration results.

Reference numeral 48 also refers to a minimum size dark area whose location is shifted in the X direction by one exposure location and the location of half of which is shifted in the Y direction. It is seen that a non-square configuration results. Minimum size dark areas 48 differ from minimum size dark areas 46 in that different halves thereof are shifted in the Y direction.

It will be appreciated by persons skilled in the art that the various shifts illustrated in the example shown in FIG. 4 may be produced in a random or pseudorandom manner, (hereinafter referred to collectively as random), thereby to substantially avoid artifacts on a multiple separation level, which occur in the prior art.

Figure 5:
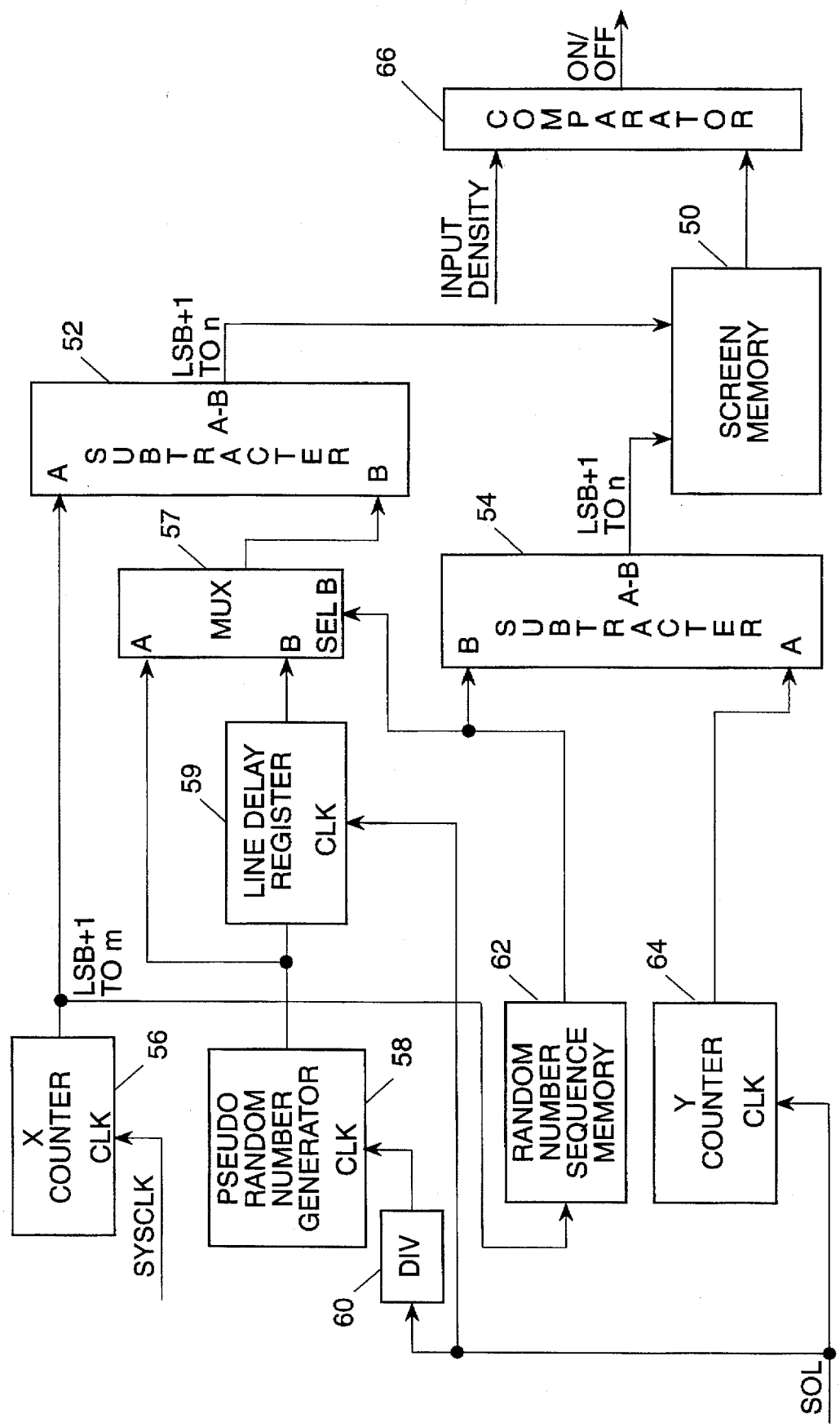
FIG. 5 is a block diagram illustration of screen processor circuitry for generating a screened reproduction of an image constructed and operative in accordance with a preferred embodiment of the present invention.

Reference is now made to FIG. 5, which is a block diagram illustration of screen processor circuitry for generating a screened reproduction of an image constructed and operative in accordance with a preferred embodiment of the present invention.

The screen processor circuitry of FIG. 5 comprises a screen memory 50 which receives inputs from a pair of subtracters 52 and 54. Subtracter 52 receives an input from an X counter 56, which is clocked by an exposure clock input SYSCLK. Subtracter 52 also receives an input from a multiplexer 57, which receives an A input directly from a pseudorandom number generator 58 and a B input from pseudorandom number generator 58 via a line delay register 59. Pseudorandom number generator 58 receives a Start of Line input via a divider 60, typically a/2 divider. Line delay register 59 receives a Start of Line clocking input. Multiplexer 57 receives a select B input from a random number sequence memory 62.

Part of the output of X counter 56, namely the Least Significant Bit +1 to m output is supplied to random number sequence memory 62. The value m>n; m being a number which corresponds to the width of an entire page, while n is a number which corresponds to the size of the screen memory. Subtracters 52 and 54 each provide a Least Significant Bit +1 to n output to the screen memory 50.

The output of the random number sequence memory 62 is also supplied to subtracter 54, which also receives the output of a Y counter 64, which is clocked by the Start of Line input.

A comparator 66 receives the output of screen memory 50 and also receives an input density input and provides ON/OFF instructions to the laser beam control circuitry 24 (FIG. 1).

The operation of the apparatus of FIG. 5 will now be described briefly.

The apparatus of FIG. 5 constitutes an exposure select operator which receives two-dimensional coordinate information relating to the laser beam position on the substrate and input density information relating to an image to be screened. The operator is characterized in that, for a constant input density, it provides a constant exposure output over each of a multiplicity of groups of contiguous coordinate regions, at least some of which are mutually non-aligned, whereby all such groups comprise an identical number of coordinate regions.

In the illustrated embodiment of FIG. 5, the two-dimensional coordinate information is received in the form of a Start of Line (SOL) input and a System Clock (SYSCLK) input. These inputs are supplied to respective Y and X counters 64 and 56.

In the prior art mutually aligned groups of coordinate regions having identical exposure thresholds are provided. In contrast to the present invention this prior art result could be attained by simply employing the SOL and SYSCLK inputs to clock respective Y and X counters, whose outputs, minus their least significant bits, could be used to provide uniform square exposure regions.

In the present invention, a pseudo random number generator and a random number sequence memory are employed to randomly shift the screen memory addresses so as to provide exposure regions of uniform overall area, but varying shapes, at least some of which are not mutually aligned.

Considering the Y address of the screen memory, it is seen that the random number sequence memory 62, which is addressed by the output of the X counter 56, is operative to provide a random single unit offset to the output of the Y counter 64. Since the least significant bit or bits of the X counter output are not employed in addressing the random number sequence memory, the offset remains constant for at least every two adjacent regions along the X-axis.

Considering the X address of the screen memory, in a degenerate case wherein the output of the random number sequence memory 62 is always zero, it is seen that there is provided a random single unit offset to the output of the X counter 56. Since the pseudo random number generator is clocked only every at least two lines by virtue of the division provided by divider 60, the offset remains constant for at least every two adjacent regions along the Y-axis.

The foregoing discussions relate to the provision of non-alignment between uniform square exposure regions.

The provision of exposure regions of uniform overall area, but varying shapes, at least some of which are not mutually aligned will now be described with additional reference to multiplexer 57 and line delay register 59.

Considering now a non-degenerate case, wherein the output of random number sequence memory 62 may be either 1 or 0, it is seen that the Y address processing is not changed, and remains as described hereinabove. The X address processing is modified in that when the output of random number sequence memory 62 is 1, the multiplexer 57 selects the output of line delay register 59, which is the output of the pseudorandom number generator 58 for the previous line. In this way, when an exposure region is offset in the Y direction, any X offset of the shifted region is also carried out.

It will be appreciated by persons skilled in the art that the present invention is not limited by what has been particularly shown and described hereinabove. Rather the scope of the present invention is defined only by the claims which follow:

I claim:

1. Apparatus for random screening comprising an exposure select operator which receives two-dimensional coordinate information relating to a screen and input density information relating to an image to be screened, the operator being characterized in that it provides, for a given input density, a multiplicity of minimum size clusters of contiguous regions which are either all exposed or all not exposed, arranged generally along exposure lines and in columns perpendicular thereto, the edges of adjacent ones of clusters which lie generally along the same exposure line or column not all being precisely mutually aligned therealong.

2. Apparatus according to claim 1 and further characterized in that it provides for a given input density, a multiplicity of clusters of contiguous regions which are either all exposed or all not exposed, whose areas are identical but whose configurations are not all identical.

3. Apparatus according to claim 1 and wherein grouping of the contiguous coordinate regions is independent of input density.

4. A method for random screening comprising an exposure select operation which receives two-dimensional coordinate information relating to a screen and input density information relating to an image to be screened, the operation being characterized in that it provides, for a given input density, a multiplicity of minimum size clusters of contiguous regions which are either all exposed or all not exposed, arranged generally along exposure lines and in columns perpendicular thereto, the edges of adjacent ones of clusters which lie generally along the same exposure line or column not all being precisely mutually aligned therealong.

5. A method according to claim 4 and wherein the operation provides for a given input density, a multiplicity of clusters of contiguous regions which are either all exposed or all not exposed, whose areas are identical but whose configurations are not all identical.

6. A method according to claim 4 and wherein grouping of the contiguous coordinate regions is independent of input density.

* * * * *